United States Patent
Chen et al.

(10) Patent No.: US 12,103,818 B2
(45) Date of Patent: Oct. 1, 2024

(54) BLUETOOTH MODULE OF ELEVATOR SYSTEM

(71) Applicant: Otis Elevator Company, Farmington, CT (US)

(72) Inventors: Hui Chen, Shanghai (CN); Kai Li, Shanghai (CN); Siqi Ma, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1721 days.

(21) Appl. No.: 16/193,795

(22) Filed: Nov. 16, 2018

(65) Prior Publication Data
US 2019/0152742 A1    May 23, 2019

(30) Foreign Application Priority Data

Nov. 20, 2017    (CN) .......................... 201711155637.8

(51) Int. Cl.
*B66B 1/46*    (2006.01)
*B66B 1/34*    (2006.01)
(Continued)

(52) U.S. Cl.
CPC ............ *B66B 1/468* (2013.01); *B66B 1/3461* (2013.01); *B66B 1/52* (2013.01); *H04W 4/80* (2018.02);
(Continued)

(58) Field of Classification Search
CPC ......... B66B 1/468; B66B 1/3461; B66B 1/52; B66B 2201/4615; B66B 2201/4638; B66B 2201/4653; B66B 1/461; H04W 4/80
See application file for complete search history.

(56) References Cited

U.S. PATENT DOCUMENTS

| | | |
|---|---|---|
| 5,682,024 A | 10/1997 | Koopman, Jr. et al. |
| 6,481,531 B1 | 11/2002 | Nagura et al. |
| (Continued) | | |

FOREIGN PATENT DOCUMENTS

| | | |
|---|---|---|
| CN | 202663399 U | 1/2013 |
| CN | 103036018 A | 4/2013 |
| (Continued) | | |

OTHER PUBLICATIONS

European Search Report for Application No. 18207400.5; Issued Aug. 19, 2019; 11 Pages.

(Continued)

*Primary Examiner* — Jeffrey Donels
(74) *Attorney, Agent, or Firm* — CANTOR COLBURN LLP

(57) ABSTRACT

A Bluetooth module in an elevator system in the field of elevator intelligent control technologies. The Bluetooth module according to the present invention is arranged substantially corresponding to a mounting hole of a first physical button/second physical button of the elevator system, such that a Bluetooth signal broadcast by the Bluetooth module can be propagated from at least part of the mounting hole to a landing zone/the interior of an elevator car. The first physical button is a physical button arranged on an elevator call panel assembly in the landing zone of the elevator system. The second physical button is a physical button arranged on an elevator call panel assembly of the elevator car of the elevator system. Embodiments can be easily implemented by transforming the existing elevator system and can achieve good coverage of Bluetooth signals in the landing zone and/or the interior of the elevator car.

23 Claims, 9 Drawing Sheets

(51) Int. Cl.
  *B66B 1/52* (2006.01)
  *H04W 4/80* (2018.01)
(52) U.S. Cl.
  CPC .............. *B66B 2201/4615* (2013.01); *B66B 2201/4638* (2013.01); *B66B 2201/4653* (2013.01)

(56) References Cited

U.S. PATENT DOCUMENTS

| | | |
|---|---|---|
| 6,601,679 B2 | 8/2003 | Crenella et al. |
| 6,651,028 B2 | 11/2003 | Kosowsky et al. |
| 8,014,718 B2 | 9/2011 | Bassiri et al. |
| 8,418,813 B2 | 4/2013 | Yim et al. |
| 2017/0174471 A1 | 6/2017 | Salmikuukka et al. |

FOREIGN PATENT DOCUMENTS

| | | | | |
|---|---|---|---|---|
| CN | 203167279 U | | 8/2013 | |
| CN | 103663008 A | | 3/2014 | |
| CN | 104030113 A | | 9/2014 | |
| CN | 103167514 B | | 2/2016 | |
| CN | 106144814 A | * | 11/2016 | |
| CN | 205709261 U | * | 11/2016 | |
| CN | 109809266 A | * | 5/2019 | ............. B66B 1/461 |
| KR | 20160043642 A | | 4/2016 | |
| KR | 20170033091 A | | 3/2017 | |
| WO | 0114237 A1 | | 3/2001 | |
| WO | WO-2017024096 A1 | * | 2/2017 | ............. B66B 1/468 |

OTHER PUBLICATIONS

Zinwave, "The Perfect Solution for Elevator Coverage—Unitivity In-Building Wireless System", available at: https://cdn2.hubspot.net/hubfs/2702507/Library%20Downloadable%20Assets/the-perfect-solution-for-elevator-coverage-72560181.pdf?t=1500535703158, accessed: Nov. 16, 2018, 2 pages.

* cited by examiner

BLUETOOTH MODULE OF ELEVATOR SYSTEM

FOREIGN PRIORITY

This application claims priority to Chinese Patent Application No. 201711155637.8, filed Nov. 20, 2017, and all the benefits accruing therefrom under 35 U.S.C. § 119, the contents of which in its entirety are herein incorporated by reference.

TECHNICAL FIELD

The present invention relates to the field of elevator intelligent control technologies, to an elevator system that uses a Bluetooth module, and more particularly, to the implementation of a Bluetooth module in an elevator system.

BACKGROUND ART

In an elevator (or referred to as a "lift") system, various elevator intelligent control technologies are emerging to implement, for example, an automatic elevator call operation or automatic registration of a destination floor so as to improve the passenger experience.

In order to realize the intelligent control of the elevator system, an important aspect is to realize automatic communication or interaction between a Bluetooth module in the elevator system and intelligent mobile terminals such as mobile phones carried by passengers. In order to realize the communication or interaction, good coverage of Bluetooth signals in the elevator system such as in a landing zone or in the inner region of an elevator car is very important. Therefore, it is necessary to consider how to install or integrate a Bluetooth module in an elevator system.

SUMMARY OF THE INVENTION

According to a first aspect of the present invention, a Bluetooth module for use in an elevator system is provided, which is capable of broadcasting a Bluetooth signal, wherein the Bluetooth module is arranged substantially corresponding to a first mounting hole of a first physical button of the elevator system, such that the Bluetooth signal broadcast by the Bluetooth module can be propagated from at least part of the first mounting hole to a landing zone, wherein the first physical button is a physical button arranged on an elevator call panel assembly in the landing zone of the elevator system; or the Bluetooth module is arranged substantially corresponding to a second mounting hole of a second physical button of the elevator system, such that the Bluetooth signal broadcast by the Bluetooth module can be propagated form at least part of the second mounting hole to the interior of an elevator car, wherein the second physical button is a physical button arranged on an elevator call panel assembly of the elevator car of the elevator system.

According to a second aspect of the present invention, an installation method for a Bluetooth module is provided, wherein the Bluetooth module is arranged substantially corresponding to a first mounting hole of a first physical button of an elevator system, such that a Bluetooth signal broadcast by the Bluetooth module can be propagated from at least part of the first mounting hole to a landing zone, wherein the first physical button is a physical button arranged on an elevator call panel assembly in the landing zone of the elevator system; or the Bluetooth module is arranged substantially corresponding to a second mounting hole of a second physical button of the elevator system, such that the Bluetooth signal broadcast by the Bluetooth module can be propagated form at least part of the second mounting hole to the interior of an elevator car, wherein the second physical button is a physical button arranged on an elevator call panel assembly of the elevator car of the elevator system.

According to a third aspect of the present invention, an elevator call panel assembly is provided, including one or more first physical buttons, each of the first physical buttons being installed in a first mounting hole on a metal panel arranged corresponding to the elevator call panel assembly; wherein the elevator call panel assembly further includes a Bluetooth module, wherein the Bluetooth module is arranged substantially corresponding to the first mounting hole, such that a Bluetooth signal broadcast by the Bluetooth module can be propagated from at least part of the first mounting hole to a landing zone.

According to a fourth aspect of the present invention, an operation panel assembly of an elevator car is provided, including one or more second physical buttons, each of the second physical buttons being installed in a second mounting hole on a metal panel arranged corresponding to the operation panel assembly; wherein the operation panel assembly further includes a Bluetooth module, wherein the Bluetooth module is arranged substantially corresponding to the second mounting hole, such that a Bluetooth signal broadcast by the Bluetooth module can be propagated from at least part of the second mounting hole to the interior of the elevator car.

According to a fifth aspect of the present invention, an elevator car is provided, including the operation panel assembly described above.

According to a sixth aspect of the present invention, a Bluetooth module for use in an elevator system is provided, which is capable of broadcasting a Bluetooth signal, wherein the Bluetooth module is installed substantially at the top of an elevator car of the elevator system.

According to a seventh aspect of the present invention, an installation method for a Bluetooth module is provided, wherein the Bluetooth module is installed substantially at the top of an elevator car of an elevator system.

According to an eighth aspect of the present invention, an elevator car is provided, including a Bluetooth module installed substantially at the top of the elevator car.

The above features and operations of the present invention will become more evident according to the following descriptions and accompanying drawings.

BRIEF DESCRIPTION OF THE DRAWINGS

The above and other objectives and advantages of the present invention will be more complete and clearer from the following detailed descriptions with reference to accompanying drawings. Identical or similar elements are represented with identical reference numerals.

DETAILED DESCRIPTION

Some of many possible embodiments of the present invention are introduced below, which are intended to provide a basic understanding of the present invention but are not intended to confirm key or decisive elements of the present invention or to define the scope to be protected. It is easy to understand that those of ordinary skill in the art can propose other alternative implementation manners according to the technical solution of the present invention without changing the essential spirit of the present invention. Therefore, the following specific implementation manners and accompanying drawings are only illustrative examples of the technical solution of the present invention and shall not be deemed to be the whole of the present invention or the definition or limitation to the technical solution of the present invention.

A Bluetooth module is used in an elevator system according to an embodiment of the present invention to implement Bluetooth communication or interaction with mobile terminals carried by passengers, thus implementing an automatic elevator call operation. The Bluetooth module is capable of broadcasting or sending a Bluetooth signal to cover a landing zone in a predetermined region and/or an inner region of an elevator car. It should be understood that the specific application manner of the Bluetooth module, such as how to specifically communicate or interact with a mobile terminal, is not limited by the embodiment of the present invention. The Bluetooth module may specifically be, but is not limited to, a Bluetooth Low Energy (BLE) module.

Here, a "physical button" is different from a virtual key (for example, a virtual key on a display screen), and can feel the action of a pressing force and generate corresponding feedback.

The Bluetooth module and its installation manner in the embodiments of the present invention are described at the same time through exemplary descriptions about an elevator call panel assembly or an operation panel assembly of an elevator car in the following embodiments of the present invention.

Figure 1:
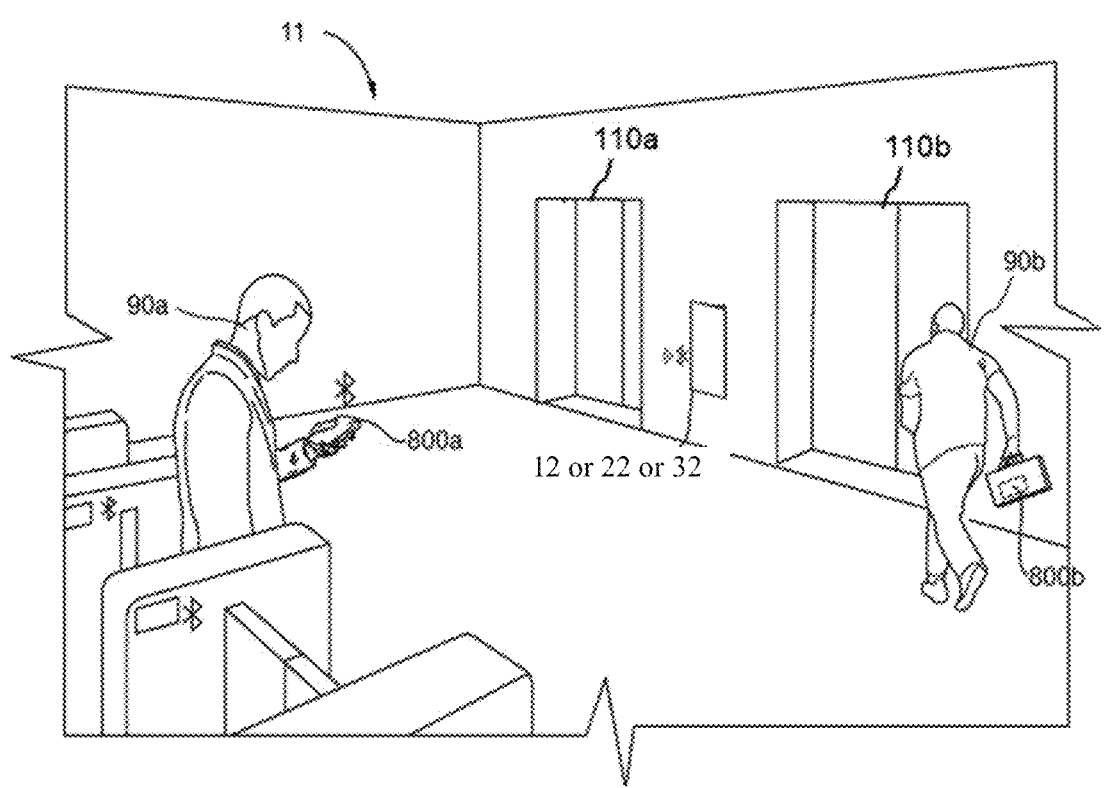
FIG. 1 is a schematic view of an application scenario of an elevator call panel assembly according to an embodiment of the present invention.

FIG. 1 is a schematic view of an application scenario of an elevator call panel assembly according to an embodiment of the present invention. As shown in FIG. 1, 11 denotes a landing zone of a certain floor of a building correspondingly provided with an elevator system according to the embodiment of the present invention. When the floor is the ground floor, the landing zone 11 may be the lobby. Landing doors 110a and 110b arranged corresponding to two elevator cars are installed exemplarily in the landing zone 11. When the car door of the elevator car is opened and the landing door 110 is opened, a passenger 90 can enter the elevator car from the landing zone 11 to take the elevator.

Each landing zone 11 is provided with an elevator call panel assembly 12 or 22 or 32. Generally, the elevator call panel assembly 12 or 22 or 32 is provided with an elevator call button for the passenger 90 to complete an elevator call operation. The elevator call button is generally a physical button. The elevator call panel assembly 12 or 22 or 32 is further provided with a Bluetooth module. The Bluetooth module can propagate Bluetooth information broadcast by it to the landing zone 11 so as to implement coverage of a Bluetooth signal in a corresponding region of the landing zone 11. A mobile terminal 800 carried by the passenger 90 entering the region will be able to receive the Bluetooth signal and establish a Bluetooth communication connection with the Bluetooth module, thus completing the elevator call operation. For example, when a passenger 90a and a passenger 90b approach the elevator call panel assembly 12 or 22 or 32 installed in the landing zone 11, mobile terminals 800a and 800b will be able to automatically receive the Bluetooth signal broadcast by the Bluetooth module in the elevator call panel assembly 12 or 22 or 32, thus completing an elevator call operation in a hands-free manner by Bluetooth interaction.

It will be understood that there may be one or more elevator call panel assemblies 12 or 22 or 32 in the landing zone 11. When there are multiple elevator call panel assemblies, Bluetooth modules in the multiple elevator call panel assemblies 12 or 22 or 32 jointly broadcast Bluetooth signals to jointly cover the landing zone 11.

Figure 2:
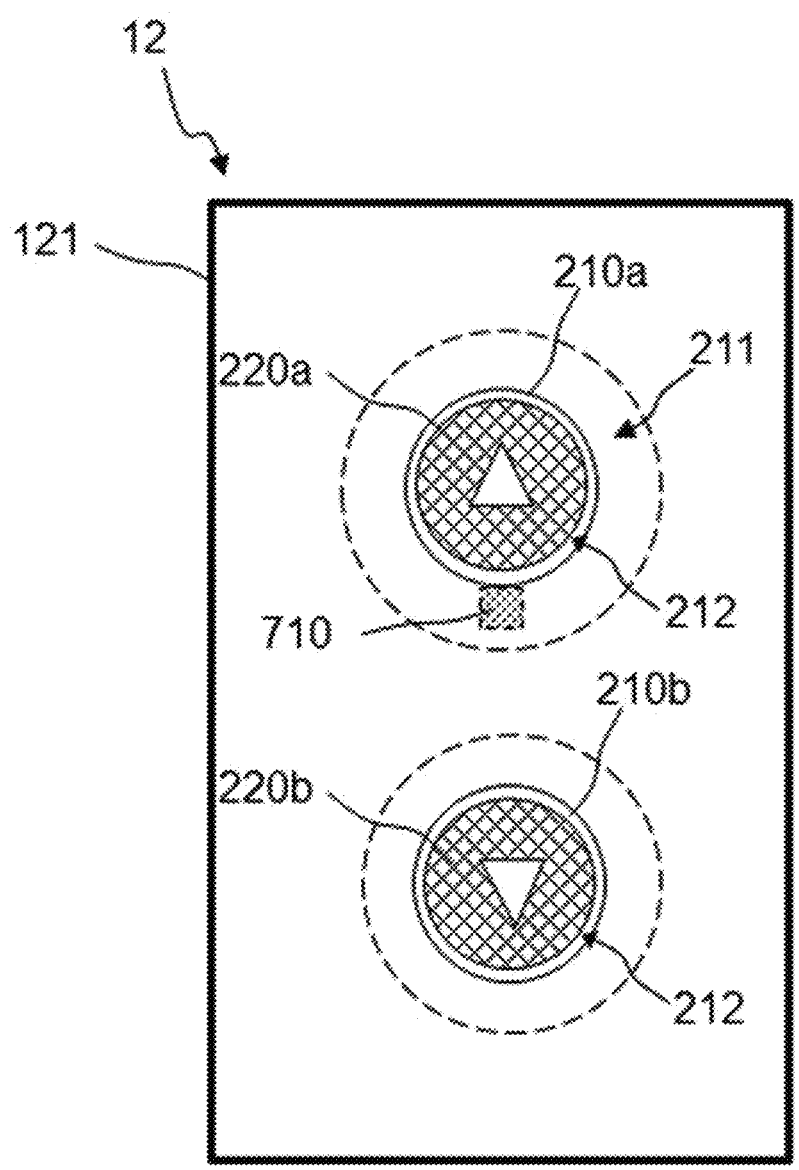
FIG. 2 is a front structural view of an elevator call panel assembly according to a first embodiment of the present invention.

FIG. 2 is a front structural view of an elevator call panel assembly according to a first embodiment of the present invention. A Bluetooth module 710 according to an embodiment is correspondingly arranged in an elevator call panel assembly 12 in this embodiment. When the Bluetooth module 710 according to the embodiment of the present invention is installed in the elevator call panel assembly 12, not only can a Bluetooth signal be effectively propagated to a landing zone 11, but also the structure of the elevator call panel assembly is changed little. Besides, it is unnecessary to specially reserve an installation position for the Bluetooth module 710 in the landing zone 11, and the original aesthetic effect of the landing zone 11 is not damaged.

As shown in FIG. 2, the elevator call panel assembly 12 includes one or more elevator call buttons 220, for example, elevator call buttons 220a and 220b. The elevator call buttons 220 are all physical buttons. Each elevator call button 220 is installed in a mounting hole 210 on a metal panel 121 arranged corresponding to the elevator call panel assembly 12. For example, the elevator call button 220a is installed in a mounting hole 210a, and the elevator call button 220b is installed in a mounting hole 210b. An "up" elevator call command can be input by pressing down the elevator call button 220a, and a "down" elevator call command can be input by pressing down the elevator call button 220b.

It should be noted that the metal panel 121 is generally fixedly installed on a wall surface of the landing zone 11. Other components (e.g., a control circuit board, not shown in the figure) of the elevator call panel assembly 12 except the elevator call button 210 are mainly installed below the metal panel 121, that is, along an inward direction perpendicular to the principal plane of FIG. 2, thus achieving a good aesthetic effect. However, the metal panel 121 may shield the propagation of, for example, Bluetooth signals.

Continuously as shown in FIG. 2, corresponding to each mounting hole 210, there is a gap 212 between the mounting hole 210 and an elevator call button 220 located in the mounting hole 210. In an embodiment, a Bluetooth signal broadcast or sent by the Bluetooth module 710 is propagated outwards by using the gap 212. The Bluetooth module 710 is arranged substantially corresponding to the mounting hole 210. Accordingly, the Bluetooth signal broadcast by the Bluetooth module 710 can be easily propagated from, for example, a region corresponding to the gap 212 of the mounting hole 210.

Specifically, the Bluetooth module 710 is installed at a position 211 near an edge of the mounting hole 210a and located below the metal panel 121. As shown in FIG. 2, the position 211 near an edge refers to a region close to an inner edge of the mounting hole 210. The Bluetooth signal broadcast by the Bluetooth module 710 installed at the position 211 can be propagated from the gap 212 to the landing zone 11 basically without intensity attenuation. As such, the shielding of the metal panel 121 for the Bluetooth signal is tactfully avoided, ensuring the radiation efficiency of the Bluetooth signal and the Bluetooth coverage area.

It should be noted that the specific size of the gap 212 is not limited, and the existing conventional normal gap size is available. As such, it is easy to assemble the Bluetooth module to the existing elevator call panel assembly, thus forming the elevator call panel assembly 12 in the embodiment of the present invention. In an embodiment, a response lamp (not shown in the figure) can be installed corresponding to the gap 212, which lights up when the elevator call button 220 is pressed down. The non-metal response lamp has minor effects on the shielding or attenuation of the Bluetooth signals broadcast by the Bluetooth module 710.

It will be understood that the number of the elevator call buttons 220 and the number of the mounting holes 210 on the elevator call panel assembly 12 are not limited to the illustrated embodiment, and the number of the Bluetooth modules 710 is not limited to the illustrated embodiment either. For example, multiple Bluetooth modules 710 can be installed at the position 211 near an edge of the mounting hole 210a corresponding to the elevator call button 220a, and corresponding Bluetooth modules 710 can also be installed in the mounting holes 210 corresponding to multiple elevator call buttons 220 respectively.

Figure 3:
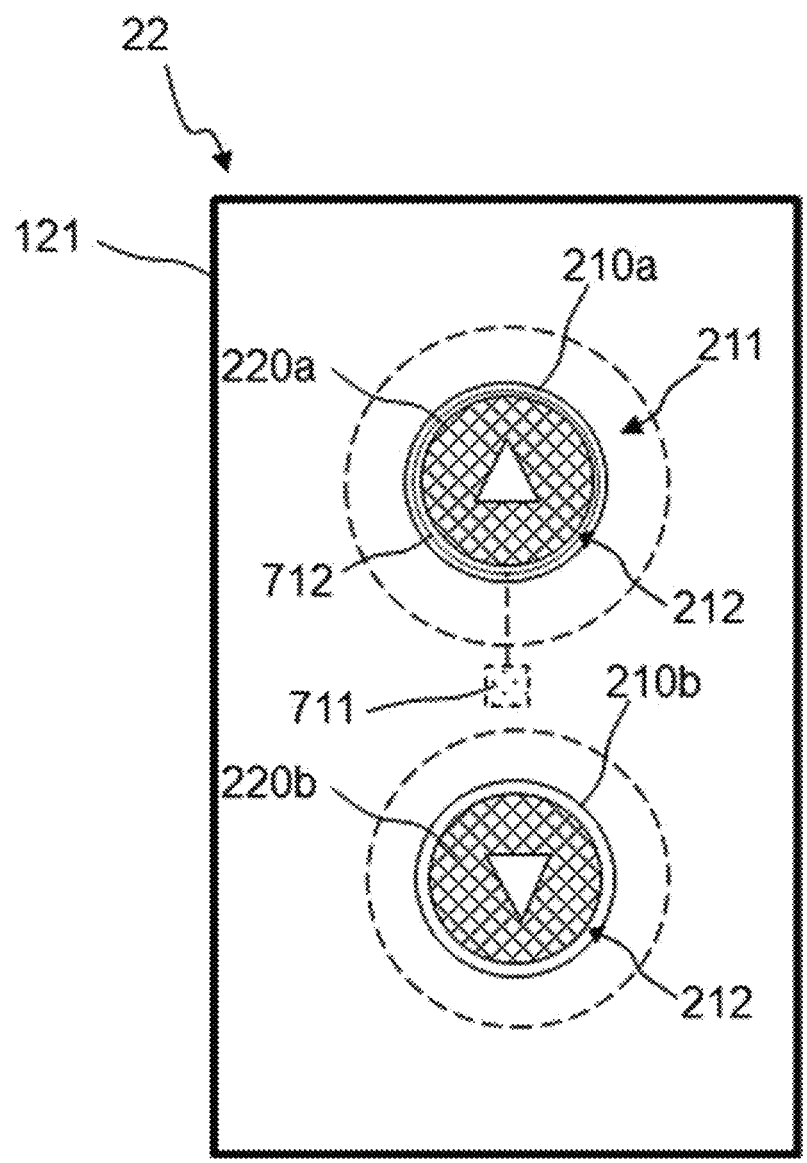
FIG. 3 is a front structural view of an elevator call panel assembly according to a second embodiment of the present invention.

FIG. 3 is a front structural view of an elevator call panel assembly according to a second embodiment of the present invention. The elevator call panel assembly 22 in this embodiment is correspondingly provided with a Bluetooth module according to an embodiment which includes a Bluetooth main module 711 and a Bluetooth antenna 712. When the Bluetooth module according to the embodiment of the present invention is installed in the elevator call panel assembly 22, not only can a Bluetooth signal be effectively propagated to a landing zone 11, but also the structure of the elevator call panel assembly is changed little. Besides, it is unnecessary to specially reserve an installation position for the Bluetooth module in the landing zone 11, and the original aesthetic effect of the landing zone 11 is not damaged.

Referring to FIG. 2 and FIG. 3, similar to the elevator call panel assembly 12 shown in FIG. 2, the elevator call panel assembly 22 also includes one or more elevator call buttons 220. Each elevator call button 220 is installed in a mounting hole 210 on a metal panel 121 arranged corresponding to the elevator call panel assembly 22, and there is a gap 212 between the mounting hole 210 and the elevator call button 220 located in the mounting hole 210. In the elevator call panel assembly 22 of this embodiment, the Bluetooth main module 711 of the Bluetooth module is configured to generate a Bluetooth signal, which, for example, can include a Bluetooth chip, a memory and so on, and can be implemented in the form of a small-sized circuit board. The Bluetooth antenna 712 is positioned and installed in the gap 212. Thus, the Bluetooth signal can be well propagated from the gap 212.

The Bluetooth antenna 712 may be specifically constructed in the same shape as the gap 212, so it can be nested in the gap 212. For example, when the elevator call button 220 is circular, the gap 212 is also circular, and the Bluetooth antenna 712 is also constructed as a circular ring with the same radial size. In another alternative embodiment, the Bluetooth antenna 712 can also be constructed, corresponding to the gap 212, as a semicircular ring or another circular ring at an arc angle. In an embodiment, a response lamp can be further arranged in the gap 212. The response lamp basically does not affect emission of the Bluetooth signal of the Bluetooth antenna 712 in the gap 212.

Continuously as shown in FIG. 3, the Bluetooth main module 711 is installed at a peripheral position of the mounting hole 210 and connected to the Bluetooth antenna 712 installed at the position of the gap through a signal line. It should be understood that the peripheral position has a wider range than the position 211 near the edge defined above. For example, the Bluetooth main module 711 installed at a peripheral position can be farther from an inner edge of the mounting hole 210 than the Bluetooth module 710 installed at the position 211 near the edge as shown in FIG. 2 is. Therefore, compared with the embodiment shown in FIG. 2, the installation position of the Bluetooth main module 711 is even more unlimited.

Similar to the elevator call panel assembly 22 in the embodiment shown in FIG. 2, the aesthetic effect can still be well maintained after the Bluetooth module is integrated. Moreover, the shielding of the metal panel 121 for the Bluetooth signal is tactfully avoided through the Bluetooth antenna 712 arranged in the gap 212, ensuring the radiation efficiency of the Bluetooth signal and the Bluetooth coverage area. Besides, the elevator call panel assembly 22 can be obtained by simple refitting the conventional elevator call panel assembly, which has a low implementation cost.

In an embodiment, the elevator call panel assembly 22 further includes a control circuit board (which is located between the metal panel 123 and the wall, not shown in the figure) arranged at a position below the elevator call button 220. The Bluetooth main module 711 can be integrated on the control circuit board.

Figure 4:
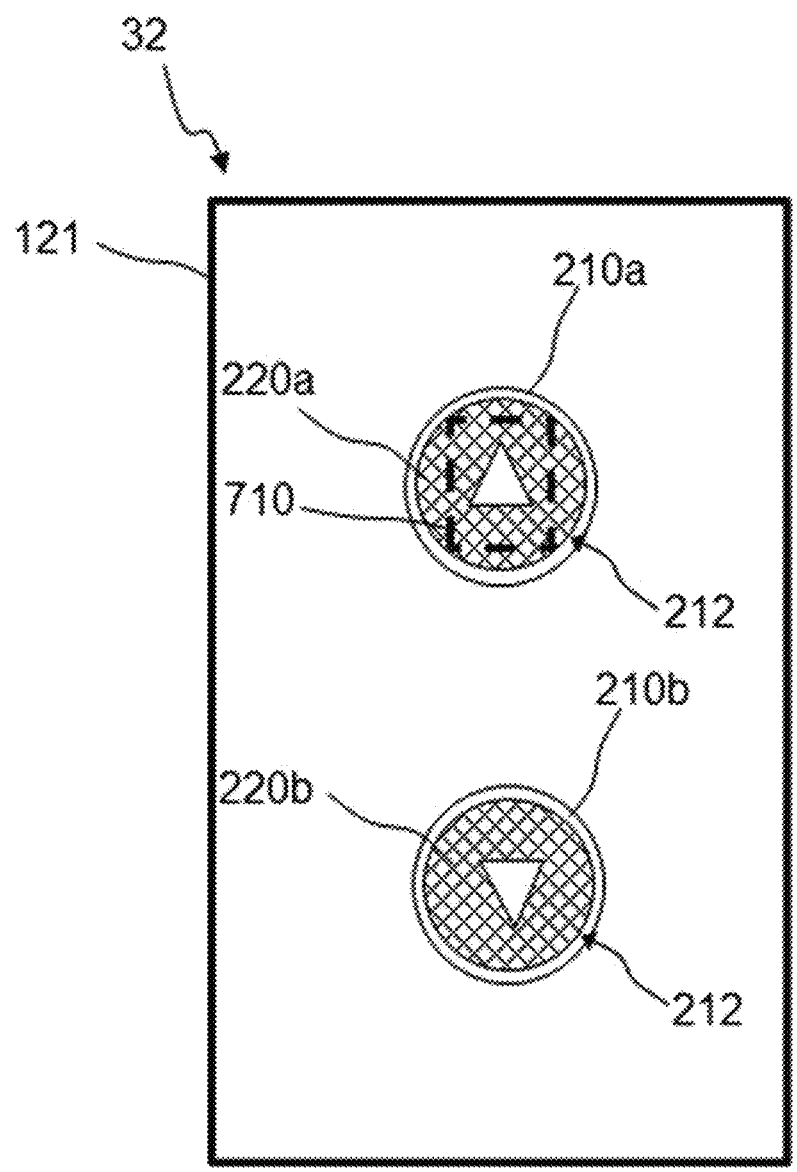
FIG. 4 is a front structural view of an elevator call panel assembly according to a third embodiment of the present invention.

FIG. 4 is a front structural view of an elevator call panel assembly according to a third embodiment of the present invention. The elevator call panel assembly 32 of this embodiment is correspondingly provided with a Bluetooth module 710 according to an embodiment. When the Bluetooth module 710 according to the embodiment of the present invention is installed on the elevator call panel assembly 32, not only can a Bluetooth signal be effectively propagated to a landing zone 11, but also the structure of the elevator call panel assembly is changed little.

Referring to FIG. 2 and FIG. 4, similar to the elevator call panel assembly 12 shown in FIG. 2, the elevator call panel assembly 32 also includes one or more elevator call buttons 220. Each elevator call button 220 is installed in a mounting hole 210 on a metal panel 121 arranged corresponding to the elevator call panel assembly 32, and there is a gap 212 between the mounting hole 210 and the elevator call button 220 located in the mounting hole 210. In the elevator call panel assembly 32 of this embodiment, the Bluetooth module 710 is implemented by a small-sized circuit board with a Bluetooth antenna integrated thereto. The Bluetooth module 710 is arranged directly below a cap end of the elevator call button 220. The cap end of the elevator call button 220 is the outermost end of the button for pressing, which faces the landing zone 11. Moreover, the cap end of the elevator call button 220 is at least partially non-metallic. For example, the cap end of the elevator call button 220 is made of a plastic material, or the middle section of the cap end of the elevator call button 220 is made of a plastic material. For example, a response lamp is integrated to the cap end of the elevator call button 220. The part of the cap end corresponding to the response lamp is non-metallic.

As such, the Bluetooth signal broadcast or emitted by the Bluetooth module 710 directly below the cap end of the elevator call button 220 can be well propagated from the non-metallic material part of the corresponding cap end to the landing zone 11, achieving that the Bluetooth signal broadcast by the Bluetooth module 710 can cover the landing zone 11 predetermined to be covered. Therefore, the Bluetooth module 710 and the elevator call panel assembly 32 in this embodiment tactfully avoid the shielding of the metal panel 121 for the Bluetooth signal, ensuring the radiation efficiency of the Bluetooth signal and the Bluetooth coverage area.

Figure 5:
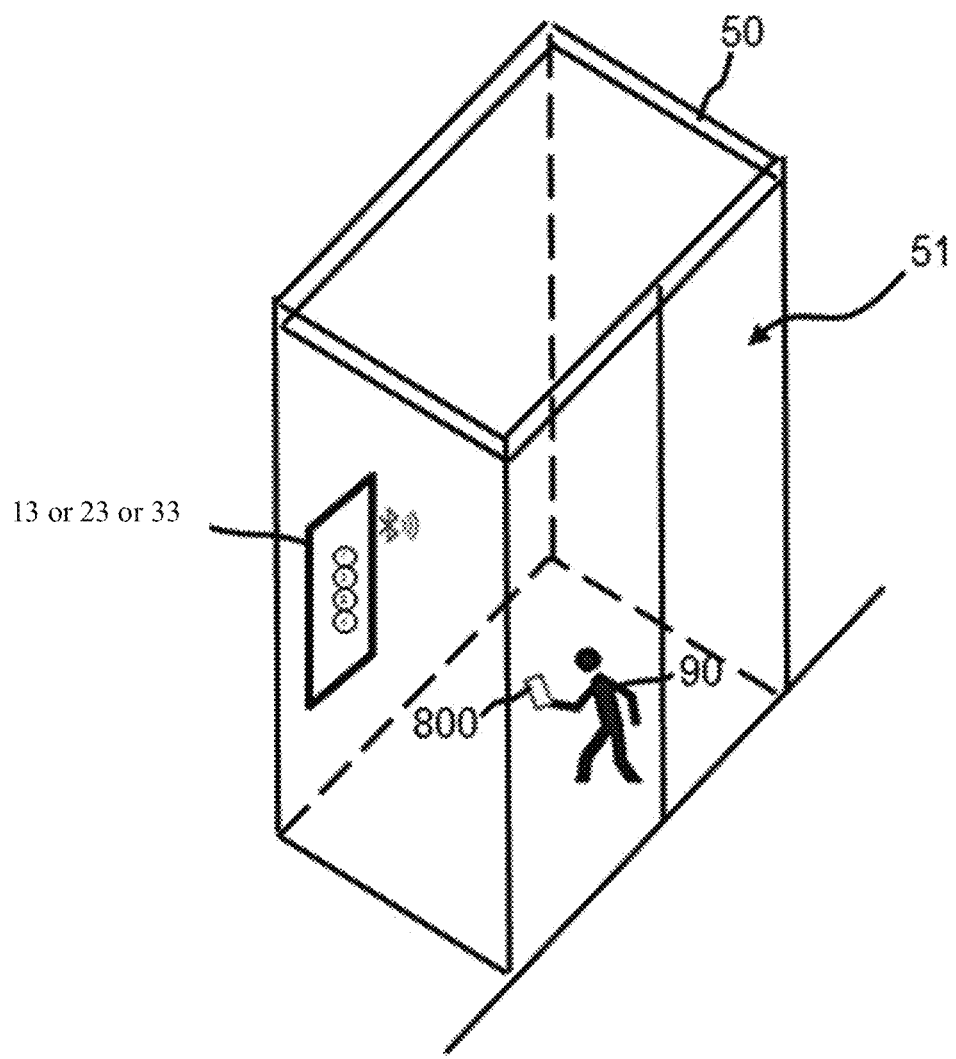
FIG. 5 is a schematic structural view of an elevator car according to an embodiment of the present invention.

FIG. 5 is a schematic structural view of an elevator car according to an embodiment of the present invention. FIG. 5 illustrates an application scenario of an operation panel assembly of an elevator car according to an embodiment of the present invention at the same time.

As shown in FIG. 5, an operation panel assembly 13 or 23 or 33 with a physical button is installed inside an elevator car 15. By operating the physical button on the operation panel assembly 13 or 23 or 33, for example, registration of a destination floor, opening or closing of the door of the elevator car and so on can be achieved.

As inner walls the elevator car 15 are generally made of metal, how the Bluetooth module according to the embodiment of the present invention is installed and how the Bluetooth module broadcasts a Bluetooth signal to the interior 51 of the elevator car will be described in the following in combination with the operation panel assembly 13 or 23 or 33 in various embodiments.

In an embodiment, the operation panel assembly 13 or 23 or 33 is further provided with a Bluetooth module. The Bluetooth module is capable of propagating Bluetooth information broadcast by it to the interior 51 of the elevator car, so as to implement coverage of a Bluetooth signal in a corresponding region of the interior 51 of the elevator car. A mobile terminal 800 carried by a passenger 90 entering the interior 51 of the elevator car will be able to receive the Bluetooth signal and establish a Bluetooth communication connection with the Bluetooth module, so as to complete operations such as registration of a destination floor and confirmation of a passenger's entering the elevator car. For example, when the passenger 90 enters the interior 51 of the elevator car, the mobile terminal 800 will be able to automatically receive the Bluetooth signal broadcast by the Bluetooth module in the operation panel assembly 13 or 23 or 33, so as to complete, in a hands-free manner through Bluetooth interaction, an operation of registering a destination floor and/or an operation of confirming that a passenger has entered the elevator car.

It will be understood that there may be one or more operation panel assemblies 13 or 23 or 33 in the interior 51 of the elevator car. When there are multiple operation panel assemblies, Bluetooth modules in the multiple elevator call panel assemblies 12 or 22 or 32 jointly broadcast Bluetooth signals to jointly cover the interior 51 of the elevator car by Bluetooth.

Figure 6:
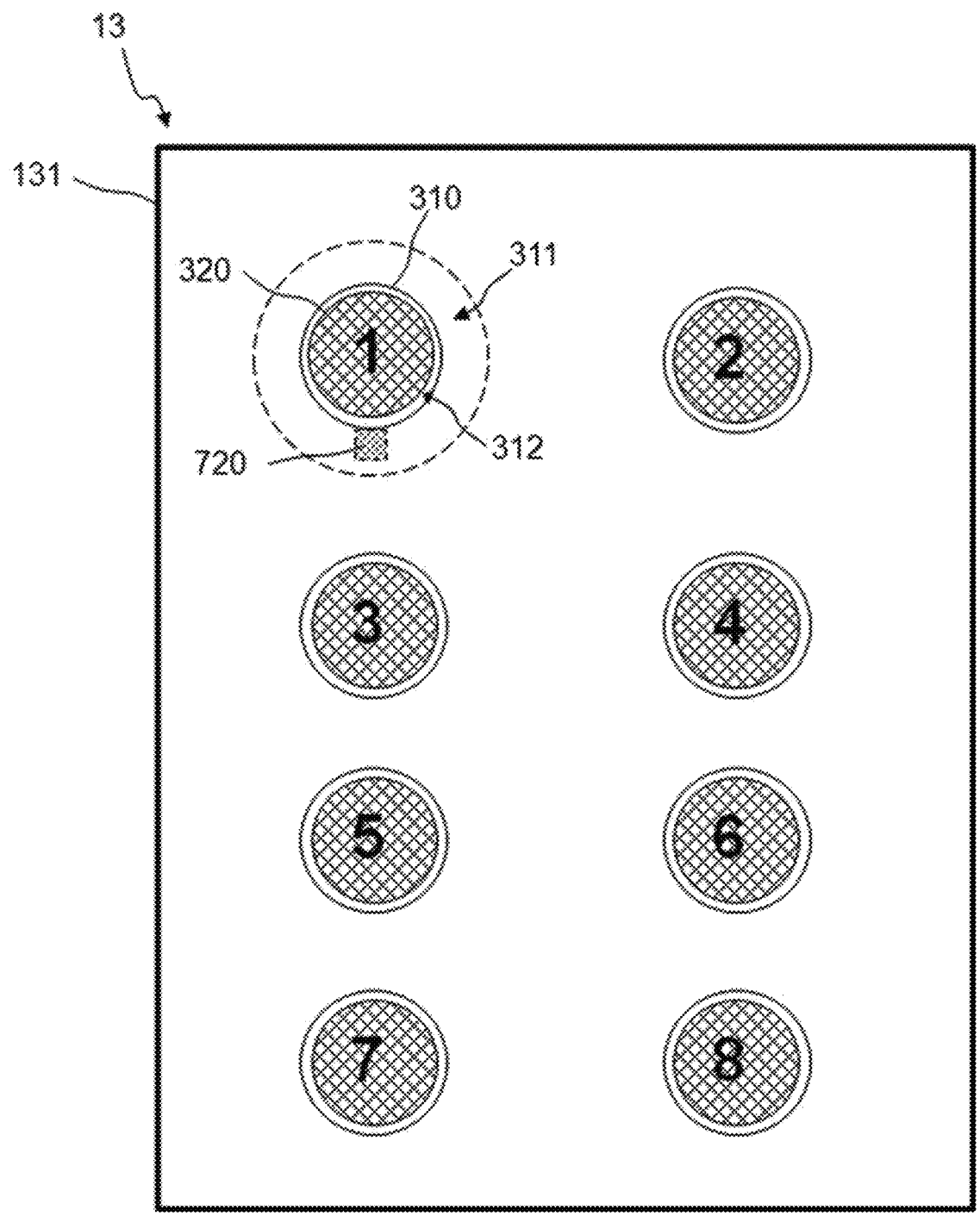
FIG. 6 is a front structural view of an operation panel assembly according to a first embodiment of the present invention.

FIG. 6 is a front structural view of an operation panel assembly according to a first embodiment of the present invention. The operation panel assembly 13 of this embodiment is correspondingly provided with a Bluetooth module 720 according to an embodiment. When the Bluetooth module 720 according to the embodiment of the present invention is installed in the operation panel assembly 13, not only can a Bluetooth signal be effectively propagated to the interior 51 of the elevator car, but also the structure of the operation panel assembly is changed little. Besides, it is unnecessary to specially reserve an installation position for the Bluetooth module 720 in the interior 51 of the elevator car, and the original aesthetic effect of the interior 51 of the elevator car is not damaged (especially when an inner wall of the elevator car 50 is a metal panel 131).

As shown in FIG. 6, the operation panel assembly 13 includes one or more operation buttons 320, for example, operation buttons 320. The operation buttons 320 may be buttons for inputting a destination floor or buttons for inputting closing or opening of the car door. They are all physical buttons. Each operation button 320 is installed in a mounting hole 310 on the metal panel 131 arranged correspondingly to the operation panel assembly 13. For example, the operation button 320 is installed in the mounting hole 310, and an operation button 320*b* is installed in a mounting hole 310*b*. By pressing down the operation button 320, the operation such as registering a destination floor can be implemented.

It should be noted that the metal panel 131 is generally fixedly installed on a wall surface of the interior 51 of the elevator car. Other components (e.g., a control circuit board, not shown in the figure) of the operation panel assembly 13 except the elevator call button 310 are mainly installed below the metal panel 131, that is, along an inward direction perpendicular to the principal plane of FIG. 6, thus achieving a good aesthetic effect. However, the metal panel 131 may shield the propagation of, for example, Bluetooth signals.

Continuously as shown in FIG. 6, corresponding to each mounting hole 310, there is a gap 312 between the mounting hole 310 and the operation button 320 located in the mounting hole 310. In an embodiment, a Bluetooth signal broadcast or sent by the Bluetooth module 720 is propagated outwards by using the gap 312. The Bluetooth module 720 is arranged substantially corresponding to the mounting hole 310. Accordingly, the Bluetooth signal broadcast by the Bluetooth module 720 can be easily propagated from, for example, a region corresponding to the gap 312 of the mounting hole 310.

Specifically, as shown in FIG. 6, the Bluetooth module 720 is installed at a position 311 near an edge of the mounting hole 310 and located below the metal panel 131. As shown in FIG. 6, the position 311 near an edge refers to a region close to an inner edge of the mounting hole 310. The Bluetooth signal broadcast by the Bluetooth module 720 installed at the position 311 can be propagated from the gap 312 to the interior 51 of the elevator car basically without intensity attenuation. As such, the shielding of the metal panel 131 for the Bluetooth signal is tactfully avoided, ensuring the radiation efficiency of the Bluetooth signal and the Bluetooth coverage area of the interior 51 of the elevator car.

It should be noted that the specific size of the gap 312 is not limited, and the existing conventional normal gap size is available. As such, it is easy to assemble the Bluetooth module for the existing operation panel assembly, thus forming the operation panel assembly 13 in the embodiment of the present invention. In an embodiment, a response lamp (not shown in the figure) can be installed corresponding to the gap 312, which lights up when the elevator call button 320 is pressed down. The non-metal response lamp has minor effects on the shielding or attenuation of the Bluetooth signals broadcast by the Bluetooth module 720.

It will be understood that the number of the operation buttons 320 and the number of the mounting holes 310 on the operation panel assembly 13 are not limited to the illustrated embodiment, and the number of the Bluetooth modules 720 is not limited to the illustrated embodiment either. For example, multiple Bluetooth modules 720 can be installed at the position 311 near an edge of the mounting hole 310 corresponding to the operation button 320, and corresponding Bluetooth modules 720 can also be installed in the mounting holes 310 corresponding to multiple operation buttons 320 respectively.

Figure 7:
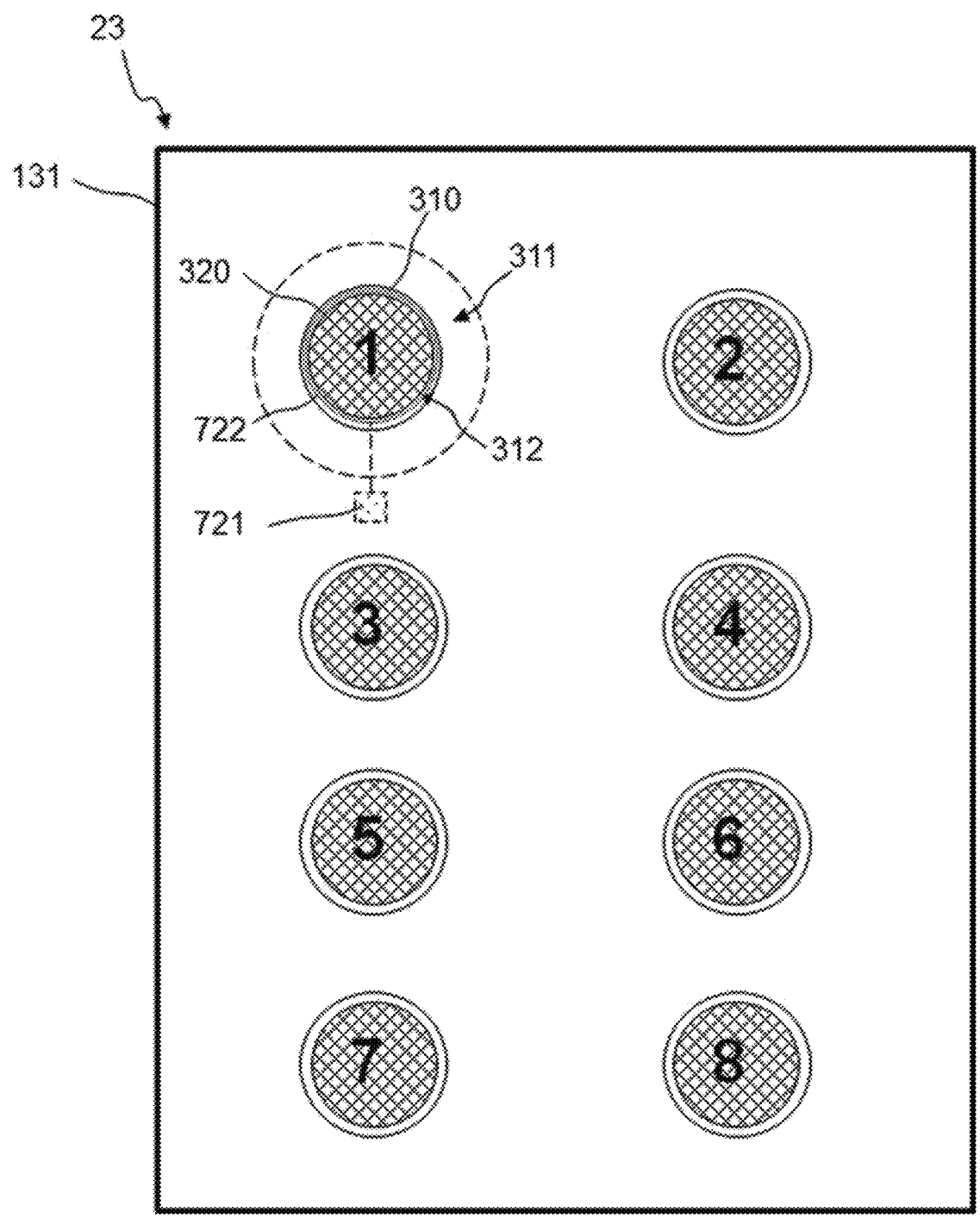
FIG. 7 is a front structural view of an operation panel assembly according to a second embodiment of the present invention.

FIG. 7 is a front structural view of an operation panel assembly according to a second embodiment of the present invention. The operation panel assembly 23 in this embodiment is correspondingly provided with a Bluetooth module according to an embodiment which includes a Bluetooth main module 721 and a Bluetooth antenna 722. When the Bluetooth module according to the embodiment of the present invention is installed in the operation panel assembly 23, not only can a Bluetooth signal be effectively propagated to the interior 51 of the elevator car, but also the structure of the operation panel assembly is changed little. Besides, it is unnecessary to specially reserve an installation position for the Bluetooth module in the interior 51 of the elevator car, and the original aesthetic effect of the interior 51 of the elevator car is not damaged.

Referring to FIG. 6 and FIG. 7, similar to the operation panel assembly 13 shown in FIG. 6, the operation panel assembly 23 also includes one or more elevator call buttons 320. Each elevator call button 320 is installed in a mounting hole 310 on a metal panel 131 arranged corresponding to the operation panel assembly 23, and there is a gap 312 between the mounting hole 310 and the elevator call button 320 located in the mounting hole 310. In the operation panel assembly 23 of this embodiment, the Bluetooth main module 721 of the Bluetooth module is configured to generate a Bluetooth signal, which, for example, can include a Bluetooth chip, a memory and so on, and can be implemented in the form of a small-sized circuit board. The Bluetooth antenna 722 is positioned and installed in the gap 312. Thus, the Bluetooth signal can be well propagated from the gap 312.

The Bluetooth antenna 722 may be specifically constructed in the same shape as the gap 312, so it can be nested in the gap 312. For example, when the elevator call button 320 is circular, the gap 312 is also circular, and the Bluetooth antenna 722 is also constructed as a circular ring with the same radial size. In another alternative embodiment, the Bluetooth antenna 722 can also be constructed, corresponding to the gap 312, as a semicircular ring or another circular ring at an arc angle. In an embodiment, a response lamp can be further arranged in the gap 312. The response lamp basically does not affect emission of the Bluetooth signal of the Bluetooth antenna 722 in the gap 312.

Continuously as shown in FIG. 7, the Bluetooth main module 721 is installed at a peripheral position of the mounting hole 310 and connected to the Bluetooth antenna 722 installed at the position of the gap through a signal line. It should be understood that the peripheral position has a wider range than the position 311 near the edge defined above. For example, the Bluetooth main module 721 installed at a peripheral position can be farther from an inner edge of the mounting hole 310 than the Bluetooth module 710 installed at the position 311 near the edge as shown in FIG. 6 is. Therefore, compared with the embodiment shown in FIG. 6, the installation position of the Bluetooth main module 721 is even more unlimited.

Similar to the operation panel assembly 23 in the embodiment shown in FIG. 6, the aesthetic effect of the interior of the elevator car can still be well maintained after the Bluetooth module is integrated. Moreover, the shielding of the metal panel 131 for the Bluetooth signal is tactfully avoided through the Bluetooth antenna 722 arranged in the gap 312, ensuring the radiation efficiency of the Bluetooth signal and the Bluetooth coverage area. Besides, the operation panel assembly 23 can be obtained by simple refitting the conventional operation panel assembly, which has a low implementation cost.

In an embodiment, the operation panel assembly 23 further includes a control circuit board (which is located between the metal panel 123 and the wall, not shown in the figure) arranged at a position below the elevator call button 320. The Bluetooth main module 721 can be integrated on the control circuit board.

Figure 8:
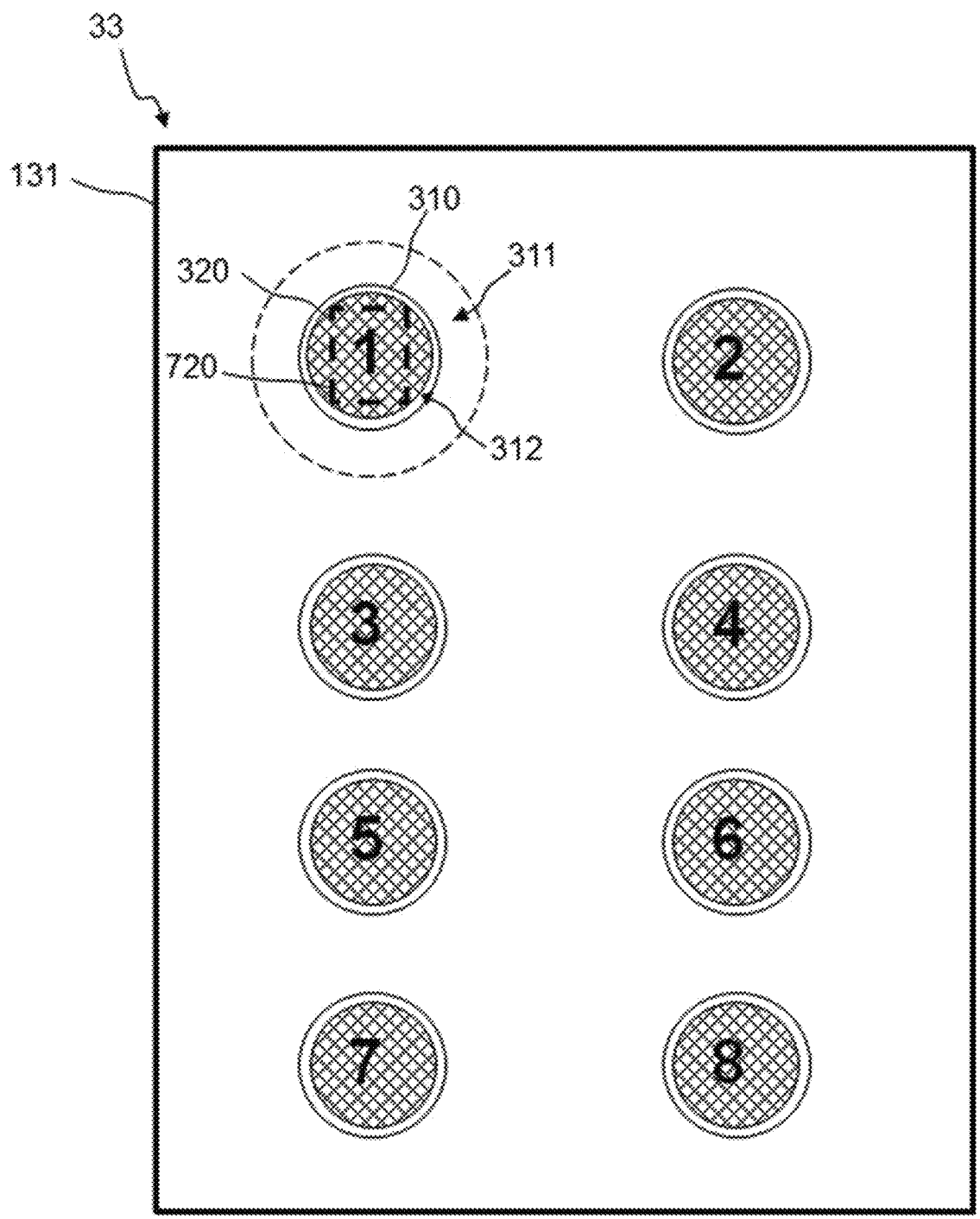
FIG. 8 is a front structural view of an operation panel assembly according to a third embodiment of the present invention.

FIG. 8 is a front structural view of an operation panel assembly according to a third embodiment of the present invention. The operation panel assembly 23 of this embodiment is correspondingly provided with a Bluetooth module 720 according to an embodiment. When the Bluetooth module according to the embodiment of the present invention is installed on the operation panel assembly 23, not only can a Bluetooth signal be effectively propagated to the interior 51 of the elevator car, but also the structure of the operation panel assembly is changed little.

Referring to FIG. 6 and FIG. 8, similar to the operation panel assembly 12 shown in FIG. 6, the operation panel assembly 33 also includes one or more elevator call buttons 320. Each elevator call button 320 is installed in a mounting hole 310 on a metal panel 131 arranged corresponding to the operation panel assembly 33, and there is a gap 312 between the mounting hole 310 and the elevator call button 320 located in the mounting hole 310. In the operation panel assembly 33 of this embodiment, the Bluetooth module 710 is implemented by a small-sized circuit board with a Bluetooth antenna integrated thereto. The Bluetooth module 710 is arranged directly below a cap end of the elevator call button 320. The cap end of the elevator call button 320 is the outermost end of the button for pressing, which faces the interior 51 of the elevator car. Moreover, the cap end of the elevator call button 320 is at least partially non-metallic. For example, the cap end of the elevator call button 320 is made of a plastic material, or the middle section of the cap end of the elevator call button 320 is made of a plastic material. For example, a response lamp is integrated to the cap end of the elevator call button 320. The part of the cap end corresponding to the response lamp is non-metallic.

As such, the Bluetooth signal broadcast or emitted by the Bluetooth module 710 directly below the cap end of the elevator call button 320 can be well propagated from the non-metallic material part of the corresponding cap end to the interior 51 of the elevator car, achieving that the Bluetooth signal broadcast by the Bluetooth module 710 can cover the interior 51 of the elevator car predetermined to be covered. Therefore, the Bluetooth module 710 and the operation panel assembly 33 in this embodiment tactfully avoid the shielding of the metal panel 131 on the inner wall of the elevator car for the Bluetooth signal, ensuring the radiation efficiency of the Bluetooth signal and the Bluetooth coverage area.

Figure 9:
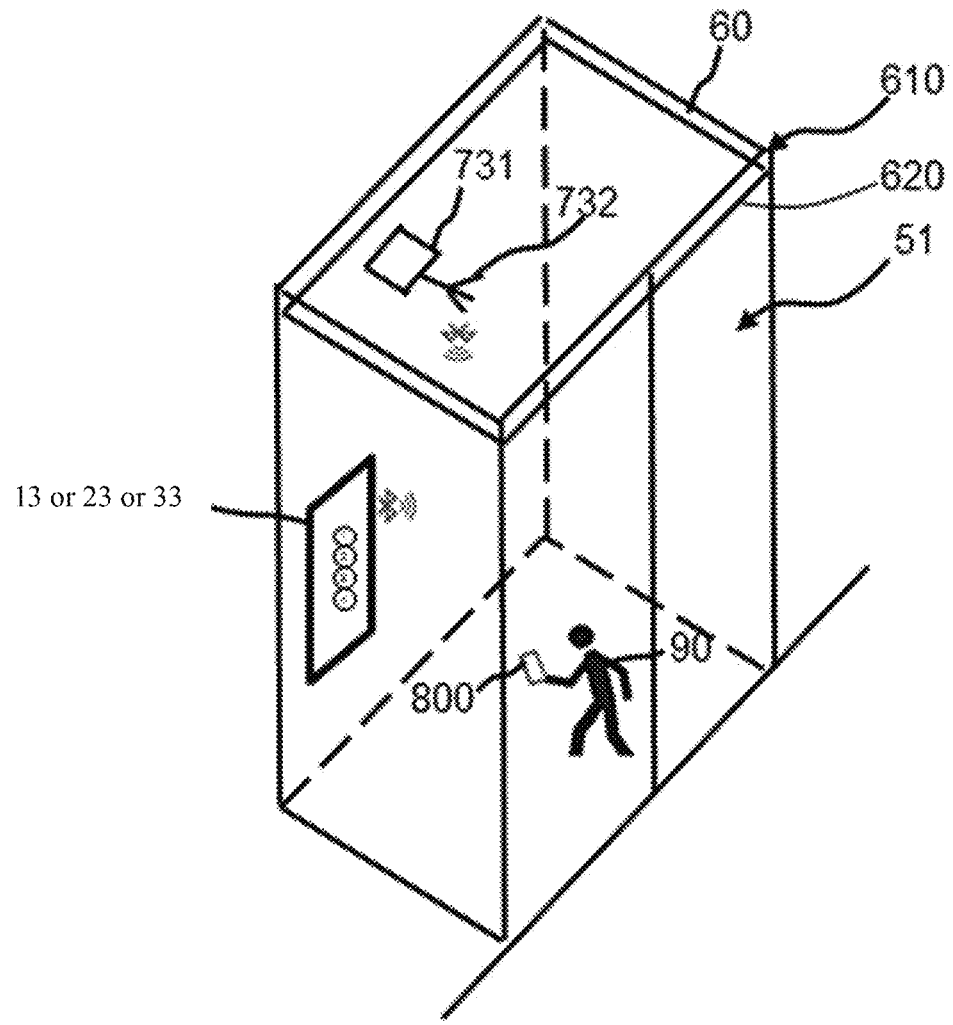
FIG. 9 is a schematic structural view of an elevator car according to another embodiment of the present invention.

FIG. 9 is a schematic structural view of an elevator car according to another embodiment of the present invention. Compared with the embodiment shown in FIG. 5, the elevator car 60 according to the embodiment of the present invention, the elevator car 60 according to the embodiment of the present invention further includes a Bluetooth module installed substantially at the top of an elevator car. The Bluetooth module of this embodiment includes a Bluetooth main module 731 and a Bluetooth antenna 732. In an embodiment, the Bluetooth module that includes the Bluetooth main module 731 and the Bluetooth antenna 732 is installed between a car ceiling 610 of the elevator car 60 and a top decorative layer 620. In this case, the decorative layer 620 has small effects on the propagation of a Bluetooth signal broadcast by the Bluetooth antenna 732, and the installation of the Bluetooth main module 731 and the Bluetooth antenna 732 has small effects on the internal beauty of the elevator car 60.

As the Bluetooth antenna 732 is installed at the top position inside the elevator car 60, the Bluetooth antenna 732 can broadcast the Bluetooth signal to the interior 51 of the elevator car therebelow, so as to well cover the interior 51 of the elevator car. Moreover, when there are multiple passengers 90 in the interior 51 of the elevator car, other passengers basically may not affect that the mobile terminal 800 carried by the passenger receives the Bluetooth signal propagated from the above. In other words, the passengers have little effects on blocking the Bluetooth signal propagated by the Bluetooth antenna 732. As such, each passenger 90 can well implement Bluetooth communication with the Bluetooth module in the top position in the interior of the elevator car 60.

In an embodiment, the Bluetooth main module 731 of the Bluetooth module can be connected to the operation panel assembly 13 or 23 or 33 through a connecting line arranged inside the car wall, for example, connected to a Remote Serial Link (RSL) processor on a control circuit board of the operation panel assembly 13 or 23 or 33. The RSL processor can establish an RSL communication connection with an elevator controller of the elevator system according to the embodiment of the present invention and so on based on an RSL protocol.

It will be understood that the Bluetooth main module 731 and the Bluetooth antenna 732 of the Bluetooth module can be integrated together. Their specific installation positions at the top of the interior of the elevator car 60 are not limited. For example, they can be installed at substantially central positions at the top of the interior of the elevator car 60.

It should be noted that when the elevator car 60 in the embodiment of the present invention is provided with a Bluetooth module at the top, in other embodiments, its operation panel assembly can be a common panel assembly, that is, the operation panel assembly is not provided with the Bluetooth module of the present invention as shown in FIG. 6 to FIG. 8.

The above examples mainly describe the Bluetooth module and its installation method, an elevator car panel assembly including a Bluetooth module, an operation panel assembly including a Bluetooth module, and a variety of elevator cars according to the present invention. Although only some implementation manners of the present invention are described, those of ordinary skill in the art should understand that the prevent invention can be implemented in lots of other forms without departing from the purport and scope thereof. Therefore, the examples and implementation manners illustrated are regarded as schematic rather than restrictive. The present invention may include various modifications and replacements without departing from the spirit and scope of the present invention as defined by the appended claims.

What is claimed is:

1. A Bluetooth module for use in an elevator system, capable of broadcasting a Bluetooth signal, wherein the Bluetooth module is arranged substantially corresponding to a first mounting hole of a first physical button of the elevator system, such that the Bluetooth signal broadcast by the Bluetooth module can be propagated from at least part of the first mounting hole to a landing zone, wherein the first physical button is a physical button arranged on an elevator call panel assembly in the landing zone of the elevator system; or
    the Bluetooth module is arranged substantially corresponding to a second mounting hole of a second physical button of the elevator system, such that the Bluetooth signal broadcast by the Bluetooth module can be propagated form at least part of the second mounting hole to the interior of an elevator car, wherein the second physical button is a physical button arranged on an elevator call panel assembly of the elevator car of the elevator system;
    wherein the Bluetooth module is arranged substantially corresponding to the first mounting hole of the first physical button of the elevator system, such that the Bluetooth signal broadcast by the Bluetooth module can be propagated from a gap between the first mounting hole and the first physical button located in the first mounting hole to the landing zone; or
    the Bluetooth module is arranged substantially corresponding to the second mounting hole of the second physical button of the elevator system, such that the Bluetooth signal broadcast by the Bluetooth module can be propagated form a gap between the second mounting hole and the second physical button located in the second mounting hole to the interior of the elevator car.

2. The Bluetooth module according to claim 1, wherein the Bluetooth module is installed at a position near an edge of the first or second mounting hole.

3. The Bluetooth module according to claim 1, wherein the Bluetooth module comprises a Bluetooth main module and a Bluetooth antenna, the Bluetooth antenna being installed at the position of the gap in the first or second mounting hole.

4. The Bluetooth module according to claim 3, wherein the Bluetooth main module is installed at a peripheral position of the first or second mounting hole and connected, through a signal line, to the Bluetooth antenna installed at the position of the gap in the first or second mounting hole.

5. The Bluetooth module according to claim 3, wherein the elevator call panel assembly comprises a first control circuit board arranged at a position below the first physical button, and the Bluetooth main module is integrated on the first control circuit board; or
    the operation panel assembly comprises a second control circuit board arranged at a position below the second physical button, and the Bluetooth main module is integrated on the second control circuit board.

6. The Bluetooth module according to claim 1, wherein at least a cap end of the first physical button or the second physical button is at least partially non-metallic, and the Bluetooth module is arranged directly below the cap end of the first physical button or the second physical button.

7. An installation method for a Bluetooth module, the method comprising:
   arranging the Bluetooth module substantially corresponding to a first mounting hole of a first physical button of an elevator system, such that a Bluetooth signal broadcast by the Bluetooth module can be propagated from at least part of the first mounting hole to a landing zone, wherein the first physical button is a physical button arranged on an elevator call panel assembly in the landing zone of the elevator system; or
   arranging the Bluetooth module substantially corresponding to a second mounting hole of a second physical button of the elevator system, such that the Bluetooth signal broadcast by the Bluetooth module can be propagated form at least part of the second mounting hole to the interior of an elevator car, wherein the second physical button is a physical button arranged on an elevator call panel assembly of the elevator car of the elevator system;
   wherein the Bluetooth module is installed at a position near an edge of the first or second mounting hole.

8. The installation method according to claim 7, wherein the Bluetooth module is installed at a position of a gap that is located in the first mounting hole and between the first mounting hole and the first physical button; or
   the Bluetooth module is installed at a position of a gap that is located in the second mounting hole and between the second mounting hole and the second physical button.

9. An elevator call panel assembly, comprising one or more first physical buttons, each of the first physical buttons being installed in a first mounting hole on a metal panel arranged corresponding to the elevator call panel assembly;
   wherein the elevator call panel assembly further comprises a Bluetooth module, wherein the Bluetooth module is arranged substantially corresponding to the first mounting hole, such that a Bluetooth signal broadcast by the Bluetooth module can be propagated from at least part of the first mounting hole to a landing zone;
   wherein the Bluetooth module is arranged substantially corresponding to the first mounting hole of the first physical button of an elevator system, such that the Bluetooth signal broadcast by the Bluetooth module can be propagated from a gap between the first mounting hole and the first physical button located in the first mounting hole to the landing zone.

10. The elevator call panel assembly according to claim 9, wherein the Bluetooth module is installed at a position near an edge of the first mounting hole.

11. The elevator call panel assembly according to claim 9, wherein the Bluetooth module comprises a Bluetooth main module and a Bluetooth antenna, the Bluetooth antenna being installed at the position of the gap in the first mounting hole.

12. The elevator call panel assembly according to claim 11, wherein the Bluetooth main module is installed at a peripheral position of the first mounting hole and connected, through a signal line, to the Bluetooth antenna installed at the position of the gap in the first mounting hole.

13. The elevator call panel assembly according to claim 11, wherein the elevator call panel assembly further comprises a first control circuit board arranged at a position below the first physical button, and the Bluetooth main module is integrated on the first control circuit board.

14. The elevator call panel assembly according to claim 9, wherein at least a cap end of the first physical button is at least partially non-metallic, and the Bluetooth module is arranged directly below the cap end of the first physical button.

15. An operation panel assembly of an elevator car, comprising one or more second physical buttons, each of the second physical buttons being installed in a second mounting hole on a metal panel arranged corresponding to the operation panel assembly;
   wherein the operation panel assembly further comprises a Bluetooth module, wherein the Bluetooth module is arranged substantially corresponding to the second mounting hole, such that a Bluetooth signal broadcast by the Bluetooth module can be propagated from at least part of the second mounting hole to the interior of the elevator car;
   wherein the Bluetooth module is arranged substantially corresponding to the second mounting hole of the second physical button of an elevator system, such that the Bluetooth signal broadcast by the Bluetooth module can be propagated from a gap between the second mounting hole and the second physical button located in the second mounting hole to the interior of the elevator car.

16. The operation panel assembly according to claim 15, wherein the Bluetooth module is installed at a position near an edge of the second mounting hole.

17. The operation panel assembly according to claim 15, wherein the Bluetooth module comprises a Bluetooth main module and a Bluetooth antenna, the Bluetooth antenna being installed at the position of the gap in the second mounting hole.

18. The operation panel assembly according to claim 17, wherein the Bluetooth main module is installed at a peripheral position of the second mounting hole and connected, through a signal line, to the Bluetooth antenna installed at the position of the gap in the second mounting hole.

19. The operation panel assembly according to claim 17, wherein the operation panel assembly further comprises a second control circuit board arranged at a position below the second physical button, and the Bluetooth main module is integrated on the second control circuit board.

20. The operation panel assembly according to claim 15, wherein at least a cap end of the second physical button is at least partially non-metallic, and the Bluetooth module is arranged directly below the cap end of the first physical button or the second physical button.

21. An elevator car, comprising the operation panel assembly according to claim 15.

22. The elevator car according to claim 21, further comprising one or more second Bluetooth modules installed at the top of the elevator car.

23. The elevator car according to claim 22, wherein the second Bluetooth module is installed between the car ceiling of the elevator car and a top decorative layer.

* * * * *